United States Patent
Hansen et al.

(10) Patent No.: US 9,974,704 B2
(45) Date of Patent: May 22, 2018

(54) ACTUATOR SYSTEM WITH BATTERY PACK

(71) Applicant: LINAK A/S, Nordborg (DK)

(72) Inventors: Søren Hansen, Sønderborg (DK); Morten Fog, Gråsten (DK)

(73) Assignee: Linak A/S, Nordborg (DK)

( * ) Notice: Subject to any disclaimer, the term of this patent is extended or adjusted under 35 U.S.C. 154(b) by 93 days.

(21) Appl. No.: 14/907,051

(22) PCT Filed: Jul. 21, 2014

(86) PCT No.: PCT/DK2014/000039
§ 371 (c)(1),
(2) Date: Jan. 22, 2016

(87) PCT Pub. No.: WO2015/010702
PCT Pub. Date: Jan. 29, 2015

(65) Prior Publication Data
US 2016/0158081 A1    Jun. 9, 2016

(30) Foreign Application Priority Data
Jul. 22, 2013  (DK) .......................... PA 2013 00440

(51) Int. Cl.
*H02J 7/00* (2006.01)
*A61G 7/05* (2006.01)
*A61G 7/10* (2006.01)

(52) U.S. Cl.
CPC ............ *A61G 7/05* (2013.01); *A61G 7/1073* (2013.01); *H02J 7/0013* (2013.01); *A61G 7/1046* (2013.01); *A61G 7/1061* (2013.01)

(58) Field of Classification Search
CPC ................................ H02J 7/0013; A61G 7/05
USPC ......................................... 320/112, 114–115
See application file for complete search history.

(56) References Cited

U.S. PATENT DOCUMENTS 5,697,110 A * 12/1997 Campbell ............ A61G 7/1019
177/144
8,319,471 B2  11/2012 Adest et al.
2006/0006850 A1*  1/2006 Inoue .................... H02J 7/0065
323/265

(Continued)

FOREIGN PATENT DOCUMENTS

WO    WO2004069125    8/2004
WO    WO2007093549    8/2007

*Primary Examiner* — David V Henze-Gongola
(74) *Attorney, Agent, or Firm* — Dykema Gossett PLLC

(57) ABSTRACT

Adjustable article of furniture comprising at least one adjustable element and furnished with an actuator system comprising at least one electrically driven linear actuator with an electrical motor and an electrical controller with an operation device, wherein the system in equipped with a battery pack for operating the system during mobile situations, where a mains supply is not readily available. The battery pack is equipped with a frontend, which allows for the battery pack to be retrofitted on existing actuator systems, without compromising the functionality of the actuator system in connection with charging of the battery. Moreover, the frontend is adapted to facilitate continued viewing of remaining power on the battery pack even though the technology of the battery pack is replaced, e.g. from lead battery to lithium ion battery.

15 Claims, 4 Drawing Sheets

(56) References Cited

U.S. PATENT DOCUMENTS

Figure 3:
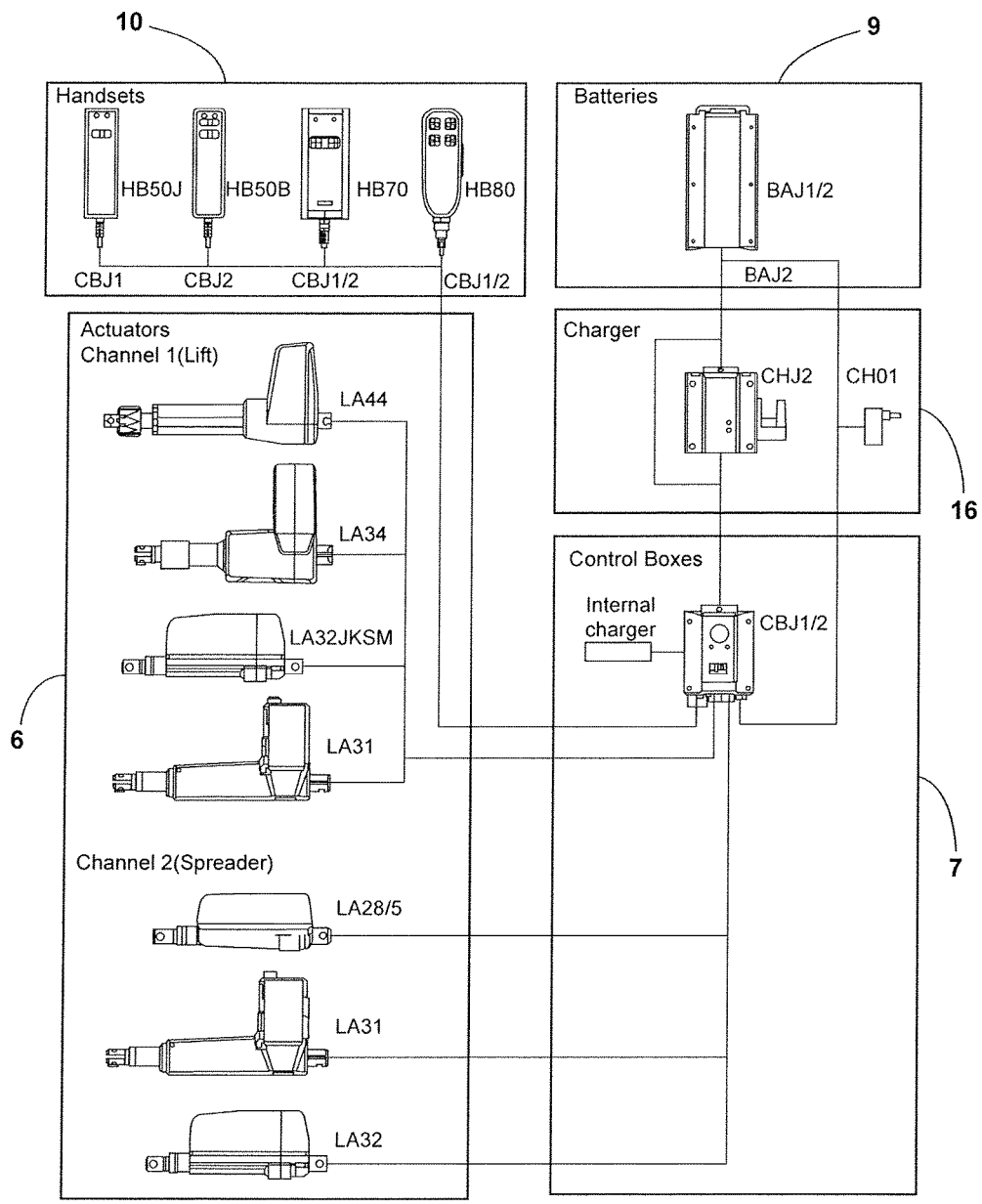

| | | | |
|---|---|---|---|
| 2006/0108979 A1* | 5/2006 | Daniel | H01M 2/105 320/112 |
| 2008/0136367 A1* | 6/2008 | Adest | H02J 7/0063 320/103 |
| 2009/0001929 A1* | 1/2009 | Posamentier | H02J 7/025 320/108 |
| 2011/0267021 A1* | 11/2011 | Payson | H02M 3/00 323/299 |
| 2013/0051104 A1 | 2/2013 | Nakano et al. | |

* cited by examiner

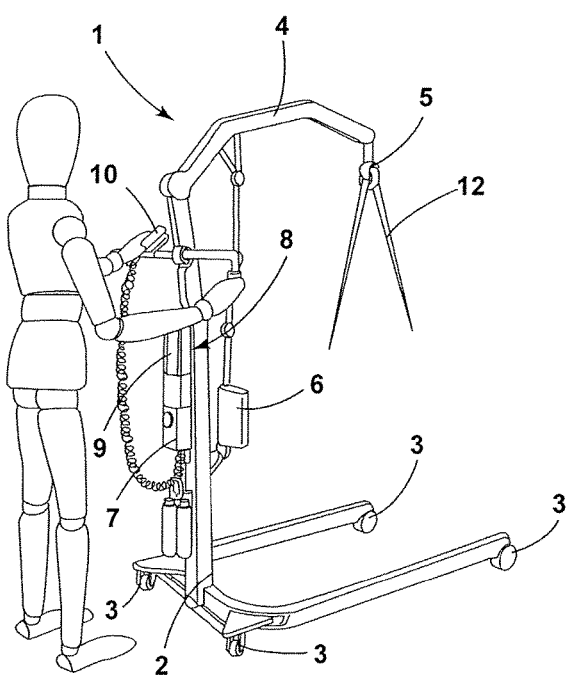
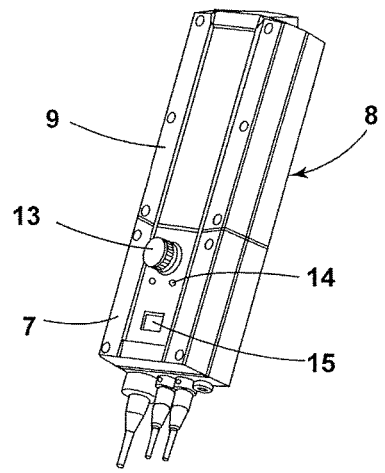
FIG. 1
FIG. 2

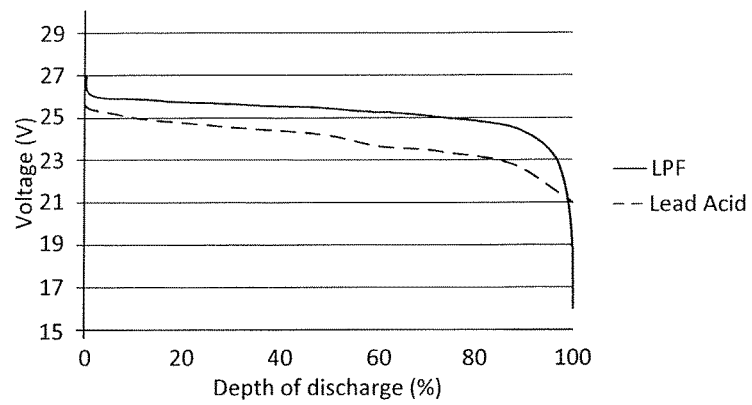
Fig. 7
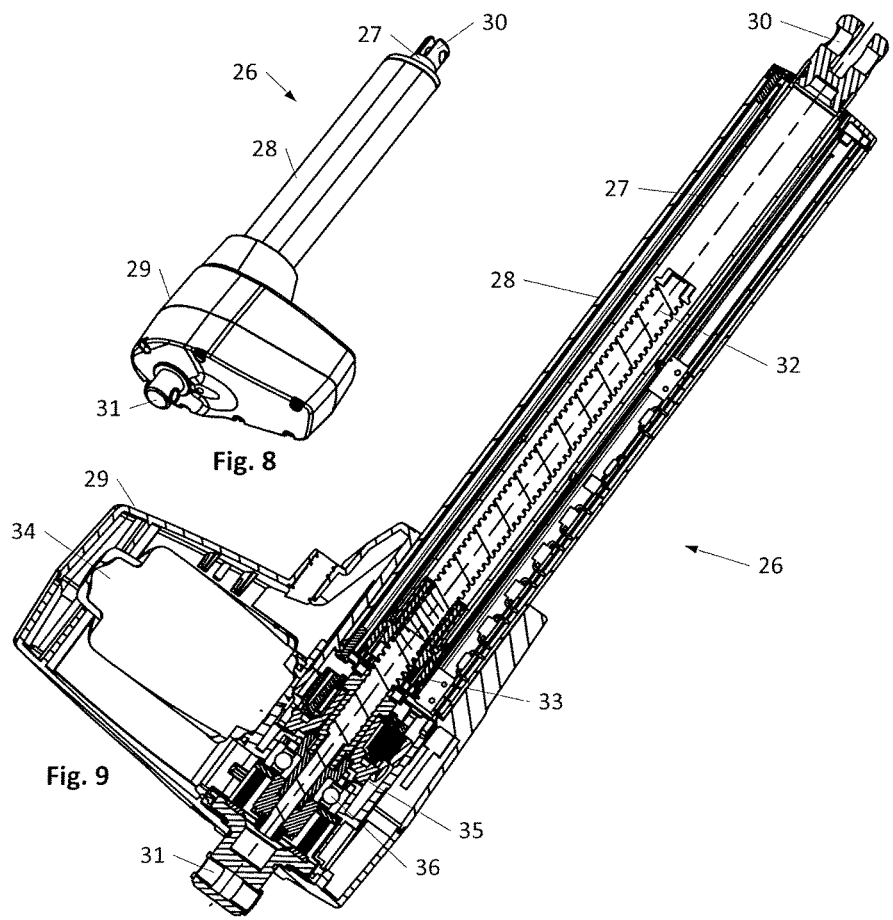
Fig. 8
Fig. 9

ACTUATOR SYSTEM WITH BATTERY PACK

CROSS-REFERENCE TO RELATED APPLICATIONS

This application is a national stage filing based upon international application no. PCT/DK2014/000039, filed 21 Jul. 2014 (the '039 application), and published in English on 29 Jan. 2015 under international publication no. WO 2015/010702 A1, which claims priority to Denmark (DK) patent application no. PA 2013 00440, filed 22 Jul. 2013 (the '440 application). The '039 application and the '440 application are both hereby incorporated by reference as though fully set forth herein.

The invention relates to an adjustable article of furniture comprising at least one adjustable element and an actuator system for adjusting the adjustable element, wherein the actuator system comprises at least one electrically driven linear actuator, possibly further comprising a drive wheel, a power supply with a rechargeable battery pack, a controller and an operation device.

Here, the term adjustable article of furniture should be understood in its broadest sense and covers tables, including sit/stand desks, work benches, counters etc. and chairs, including treatment chairs, dentist's chairs, hair salon chairs, beauty parlor chairs, wheelchairs etc. and beds, including adjustable beds for private homes, care beds, hospital beds, treatment tables, stretchers, patient lifters etc.

For convenience the description of the invention departs from patient lifters, however, any of the mentioned types of furniture could have been chosen. Patient lifters are used for moving patients with impaired mobility form a bed to a different article of furniture and vice versa. To improve the mobility of the patient lifter this is often equipped with a power supply in the shape of a battery pack, such that the patient lifter can be used without being connected to mains. The patient lifter may also be equipped with drive wheels cf. e.g. WO 2004/069125 A1 to Asger Gramkow or U.S. Pat. No. 5,697,110 A to Campbell, wherein the battery and the charging thereof is mentioned in column 12, line 53 and forward. A more detailed example of a drive wheel is shown in WO 2007/093549 A1 to Tente GmbH & Co. KG. In the publication the drive wheel is shown in connection with a hospital bed but can also be used in connection with a patient lifter.

According to the prior art for a mobile piece of furniture equipped with an actuator system, battery packs have been equipped with so-called lead-acid accumulators (in the following referred to a lead batteries). Lead-acid accumulators are rechargeable batteries with lead electrodes and an electrolyte consisting of an acid. This battery type has been attractive due to its low price. The introduction and commercialization of rechargeable batteries of the lithium ion type has, however, changed the picture, such that these are now attractive alternatives. Compared to a lead battery a lithium ion battery have the following advantages: Half the size for the same capacity, a third the weight for the same capacity, constant voltage until fully discharged, five times longer battery life and more environmentally friendly. Lithium ion batteries are on the other hand more sensitive to charging with too high voltage, in which case there is a risk of permanent damage to the battery or, at worst, explosion if the voltage supplied during charging is too high.

For new patient lifters it would be fairly simple to introduce and manufacture a battery pack using lithium ion technology. Replacing old lead batteries with new lithium ion batteries on existing patient lifters is, however, a quite different matter, as the voltage levels of lead batteries are different than lithium ion batteries. This will e.g. cause problems when the lithium ion battery should be charged with a charger intended for charging lead batteries. Moreover, the decreasing voltage reflecting the charging state of a lead battery are in older patient lifters used for giving a visual indication of the charging state of the battery. As mentioned, the output voltage of a lithium ion battery will practically be unchanged until immediately before the battery is completely discharged. It will in other words not be possible to determine the charging state of the battery based on a simple measurement of voltage as is the case with lead batteries.

As the marked for replacement batteries for adjustable articles of furniture is large, it is therefore desired to provide a solution to the outlined problem, i.e. to provide an alternative battery pack, which can use batteries of an different chemistry, e.g. lithium ion, and still be directly compatible with the common battery packs with lead batteries.

This is achieved according to the invention by designing the adjustable article of furniture as stated in claim 1, where the actuator system is equipped with a frontend, for interface between the battery pack and the rest of the actuator system, which allows the battery pack to be equipped with a different type of batteries than the first type and still to the actuator system appear as a battery pack with the first type of batteries.

This is expedient as a battery pack with e.g. lithium ion batteries thus can be used as replacement for a battery pack with lead batteries.

In an embodiment the frontend comprises a charging circuit configured to adapt the charging voltage i.e. both up and down, for supplying the battery with a suitable voltage for charging the battery.

The charging circuit can e.g. comprise a booster configured to charge the lithium battery with a higher voltage than the voltage supplied from the power supply. Since a battery charger for a lead battery is not capable of supplying the necessary voltage for charging a lithium battery to its full capacity, the booster is expedient, as it is thus possible to increase the voltage and charge the battery. The booster can be implemented as a switch mode converter. In the same manner the charging circuit can be equipped with a regulation, which can also be a switch mode regulation, which, in case the supply voltage is too high for direct charging of the batteries, regulates the voltage to an appropriate level.

As lithium ion batteries a vulnerable to overvoltage, the frontend comprises a safety circuit for protection of the individual battery cell. The protection is primarily against overvoltage. This is a must when using lithium ion battery technology, as variations of these otherwise can explode. In case of an overvoltage the safety circuit will protect the cell by interrupting the connection until the voltage level again has reached an acceptable level.

In yet another embodiment the frontend further comprises a circuit, which monitors the charge running into the battery and the charge running out of the battery and based on the charging state of the battery provides an output voltage corresponding to the output voltage, which a standard lead battery with the same charge would have. The controller of existing patient lifters is configured to monitor and graphically show the status of the charging of the batteries. By lead batteries the voltage level can in a simple manner be used as an expression therefor. By lithium ion batteries the voltage is practically unchanged until immediately before the battery is completely discharged. It is thus necessary to monitor the charge (energy) supplied to the battery and the charge drawn from the battery, to determine the remaining power. For that purpose a coulomb counter in the shape of a chip dedicated for the purpose may be provided or it could be done by expansion of the controller or frontend for this purpose. Based on the estimated remaining power in the battery the frontend will during idle periods adapt the output voltage of the battery to the voltage, which a reference battery, e.g. a lead battery with a corresponding estimated remaining power would have. In order to be able to adapt the voltage the frontend must be configured with a table, which analogously or in voltage jumps can indicate which output voltage corresponds to a given remaining power of the batteries in the battery pack.

Expediently, when a current running out of the frontend exceeds a given threshold the frontend will regulate the output voltage such that the controller is supplied directly with the output voltage of the battery. Thus, the controller would benefit from the full power of the battery without voltage decrease, which is used for an emulation or showing of the remaining power on the battery.

As the battery pack should also be compatible with new patient lifters, which can handle the battery pack with a new type of batteries, e.g. lithium ion batteries, directly without the pack necessarily being compatible with reference batteries, e.g. lead batteries of an older type, the frontend is equipped with means for communication of data, including charging status from the battery pack to the controller. Thus, the battery pack can digitally communicate information about remaining power of the battery pack directly without having to simulate lead battery voltages on the output.

In that the frontend is equipped with means for communication of data, including capability of the charger, from the controller to the battery pack, it is possible for a patient lifter to signal that this is of a new type which does not require emulation of the battery pack or that this is a battery pack with lead batteries, but that the patient lifter can use the battery pack directly and acknowledge its technology. Particularly the controller can indicate that the charger is capable of supplying a voltage high enough for charging the lithium ion battery to its full capacity. Moreover, the controller can indicate that the charger is capable of supplying a higher charging current, for which reason the battery pack can adjust its charging circuit to support this. The communication can take place via a traditional wired connection.

As electric noise is generated during charging of the battery and operation of the electric linear actuator it is expedient for the frontend to be configured with an inductive link functioning as interface for the communication between the controller and the charger. The inductive link thus functions as a galvanically separated coupling, which prevents noise. The communication via the inductive link takes place with burst signals via the FSK (frequency shift keying) principal. More specifically, a burst with a first center frequency can be a signal corresponding to a logical zero and a burst with a second center frequency can be a signal corresponding to a logical one. For verification the signals must be of a duration, which is further specified as a valid signal. The signals, which are sent between the controller and the battery pack and vice versa, must be described in a protocol, such that the communication is unambiguous for both parties.

As an alternative to an inductive link the data communication via the communication link can be optical, e.g. by means of optocouplers.

Thus, the communication is galvanically separated from the power supply with the appertaining advantages in connection with immunity against electric noise.

If the battery pack via the communication link receives a signal, which indicates that a dedicated lithium ion charger is available or if the frontend measures a voltage level from the connected charger, which shows that the charger is capable of supplying a voltage exceeding a predetermined threshold, which corresponds to a voltage, which is sufficient for charging the battery, the frontend is configured to by-pass the charging circuit, alternatively the booster in the charging circuit. This is advantageous in case the booster is not configured to handle as large charging current as the battery is capable of absorbing and a current as large as the dedicated charger can supply.

In yet another embodiment the frontend is separated from the battery pack and incorporated in a separate housing. In case it is desired to retrofit an existing patient lifter with a lithium ion battery pack, the frontend module is thus elegantly inserted as an interface between the two units and ensures that the lithium ion battery pack by the controller of the patient lifter will be considered a standard lead battery pack, after which the battery pack can be utilized and provide the patient lifter with the superior characteristics of the lithium ion technology.

Figures 4A, 4B, 4C:
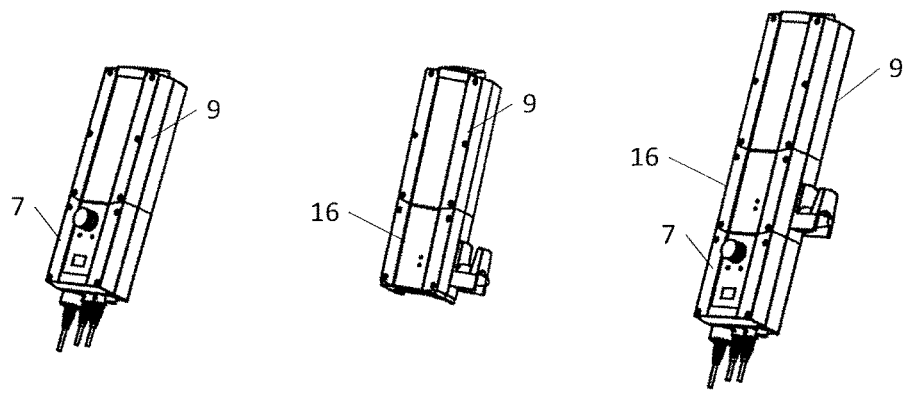
Figure 5:
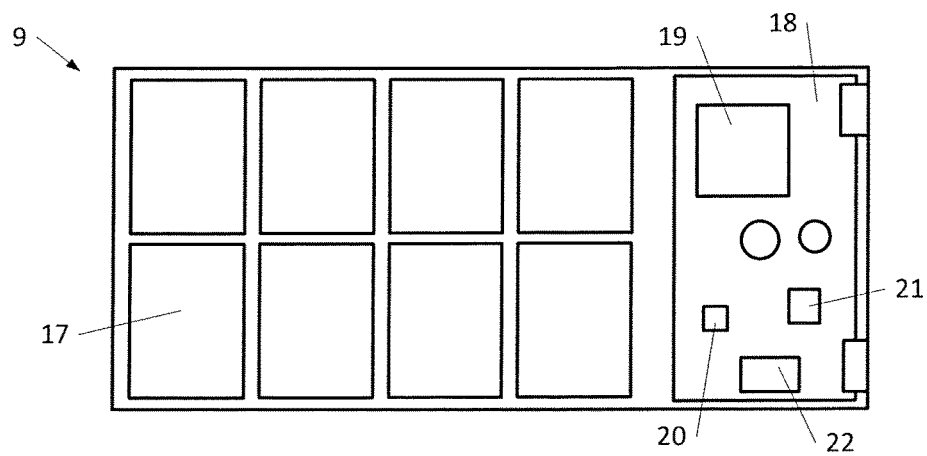
Figure 6:
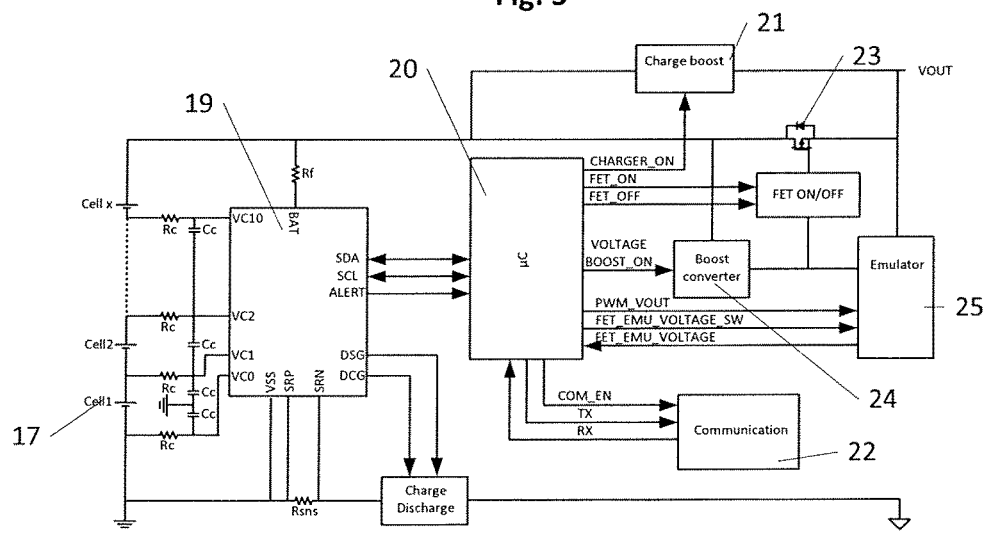

A linear electric actuator system will be described more fully below with reference to the accompanying drawing, in which:

FIG. 1 shows a schematic view of a patient lifter comprising an actuator system in a first embodiment, FIG. 2 shows an interconnected control box and battery pack, FIG. 3 shows a schematic diagram of combination possibilities in the actuator system of the patient lifter, FIG. 4 shows three typical configurations of control box, charger and battery pack, FIG. 5 shows a schematic view of the individual components of the battery pack, FIG. 6 shows a circuit diagram of the battery pack and including the frontend circuit, FIG. 7 shows a graph of a discharging curve for a lead battery and a lithium ion battery, respectively, FIG. 8 shows an electrically driven linear actuator, and FIG. 9 shows a longitudinal section through an electrically driven linear actuator.

FIG. 1 shows a patient lifter 1 comprising a frame 2 equipped with drive wheels 3. An arm 4 is secured to one end of the frame 2 and may be tilted about a horizontal axis. A lifting hook 5 for lifting a patient is secured to the other side of the arm 4. The arm 4 may be raised and lowered by means of an electrically driven linear actuator 6, of which one end is secured to the frame 2 and the other end is secured to the arm 4. The patient lifter 1 comprises a control box 7 secured to the frame. The control box 7 comprises a controller and a battery 9, wherein the battery in the shown embodiment is located in a separate battery box 8. The patient lifter 1 further comprises an operation device 10, which here is shown as wire connected to the control box 7. It is, however, understood that the operation device may of cause also be wireless. By means of the operation device 10 the linear actuator 6 can be activated to raise or lower the arm 4. For lifting a patient a lifting boom 12 is typically inserted into the lifting hook 5.

The control box 7 and the battery box 8 with the battery pack 9 are moreover shown in FIG. 2. The control box 7 is, as it appears, equipped with an emergency switch 13, which in cases with a risk of patient injury can interrupt the operation of the linear actuator and prevent or at least limit the accident. The control box 7 is also equipped with various indicator lamps 14 for monitoring the controller. For instance a lamp will indicate whether a mains supply has been connected. Another lamp indicates whether the battery pack 9 is being charged. Moreover, there is a panel 15 showing an estimate of the remaining capacity of the battery. In case of a patient lifter for lead batteries the indication will be based on a measurement of the voltage of the battery, as the voltage of a lead battery reflects the discharging ratio, which in practice is assumed to run in a linear pattern.

A schematic diagram of the actuator system of the patient lifter is shown in FIG. 3, which discloses the controller (the control box 7) and a selection of linear electric actuators 6 which can be connected along with a selection of operation devices 10 which can be connected. With the expansion of the controller (the control box 7) with the battery pack 9, the patient lifter has become mobile and operational without being connected to a power supply connected to mains. The diagram further shows various chargers 16, which can be used for operation of the patient lifter 1 directly supplied from mains. The chargers can moreover charge the battery pack directly or through the controller.

The typical ways of connecting the three main components, control box 7, battery pack 9 and charger 16, is shown in FIG. 4, which in illustration a) shows a control box arranged with a connected battery box. Illustration b) shows the battery pack 9 disconnected from the control box 7 and placed in a charger 16, which practically can be hung on a wall. A battery pack 9 serving as a reserve can thus be charged in the charger 16 and serve for replacing a discharged battery pack 9, which has been used by the patient lifter 1. The illustration c) shows another embodiment, where the three main components are joint on the patient lifter 1. When the patient lifter is not being used the charger 16 can be connected to mains for supplying the control box 7 and/or charging the battery pack 9.

The battery pack 9 is further shown schematically in FIG. 5 and may be equipped with lead batteries, but may also be equipped with lithium ion batteries or batteries of another chemical composition. The battery pack 9 comprises a number of battery cells 17, here shown as eight individual battery cells 17. The battery pack 9 further comprises a printed circuit board 18, on which a safety circuit 19 is placed, which continuously protects the battery cells 17 from overvoltage. The battery pack is further equipped with a microprocessor 20, which monitors the remaining battery capacity.

In order for the battery pack 9 to be used for retrofitting on existing patient lifters 1 configured to support battery packs with lead batteries, the battery pack 9 is equipped with a frontend. The frontend can be configured as a HW component dedicated to the function, e.g. an ASIC 21, or be in the shape of instructions executed in the microprocessor 20. The battery pack 9 can thus by means of the frontend 21 adapt the battery cells 17 with a different type of chemistry than the reference type and use these and emulate to the controller 8 that the battery pack 9 is a battery pack 9 of the reference type. Moreover, the printed circuit board 18 is fitted with a circuit 22 adapted to function as an interface in terms of communication with the battery pack. This can be as a wired connection or as a galvanically separated connection, e.g. an inductively or optically coupled connection.

In a specific example of a battery equipping of the battery pack 9 the battery cells 17 in the battery pack 9 are of the lithium ion type, where the reference type are of the previously used lead type. Thus, an upgrading of the patient lifter 1 to lithium ion technology with the before mentioned superior characteristics without losing the original functionality of the patient lifter 1 is achieved. Here is especially meant the possibility of charging the lithium ion battery pack 9 to its full capacity despite of its higher nominal voltage level along with the possibility of monitoring the remaining power of the battery pack 9.

As shown in FIG. 6, which shows the diagram of the circuit on the printed circuit board 18, the battery cells 17 are protected by a safety circuit 19, which also controls the charging and discharging of the battery cells 17. The safety circuit 19 further communicates with the microprocessor 20 via a serial data connection. The charging of the lithium ion battery cells to their full capacity is ensured in that the frontend is equipped with voltage booster means (here after called booster circuit) in the shape of a switch mode boost converter (charge boost) 21, configured to raise the charging voltage to the nominal voltage of the battery cells 17. The charge boost function is controlled by the microprocessor 20. In case the battery is discharged so much, that the voltage is below the voltage level of the connected charger 17, the power of the charger is effectively used in that this is connected directly to the battery pack 9. This is controlled by the microprocessor 20 via a FET charging transistor 23. This is indicated in the diagram with the FET_ON and FET_OFF functions. When the battery pack 9 is charged as much as possible by direct coupling to the charger 17, the booster circuit 21 is instated, which ensures a full charging of the battery 9. The FET charging transistor 23 is disconnected when the booster circuit 21 is activated. Thus, the booster circuit 21 can be dimensioned to charge the battery 9 using less current. In case the charger 17 is capable of supplying sufficient current, it will be possible to by-pass the booster and achieve a shorter charging time again by utilizing the FET charging transistor 23. In order for a patient lifter, which has been retrofitted with a battery pack 9 with lithium ion technology, to be able to maintain its functionality in connection with the indication of remaining power in the battery pack, the frontend is configured to measure the remaining power of the battery and simulate an idle voltage on the battery pack 9 corresponding to the voltage, which a lead battery pack with the corresponding remaining power would have. As the remaining power on a lithium ion battery pack cannot be measured by means of a simple voltage measurement, the frontend is configured to be able to measure the input and output power, e.g. by means of a hardware based coulomb counter dedicated for that purpose. Depending on the remaining power the frontend must, by inquiry into a table showing the voltage of a lead battery compared to the remaining power, adjust the output voltage to reflect this proportion. The table can be saved in a memory in connection with the microprocessor 20. For explanation of this, reference is made to FIG. 7, which shows a comparison of the course of the voltage for a discharging of a lithium ion battery and a lead battery, respectively. As can be seen, the voltage level of the lead battery is gradually declining until fully discharged, whereas the voltage level of the lithium ion battery remains relatively stable on the same level until immediately before it is fully discharged. Since the microprocessor 20 calculates the remaining capacity of the lithium ion battery, it is possible based on the table to determine how high output voltage a lead battery with the same remaining capacity would have. The microprocessor 20 can thus control the boost converter 24 and the emulator 25, during idle periods, to supply an output voltage corresponding to the remaining capacity of the battery 9, such that a retrofitted patient lifter 1 will show the correct remaining capacity in the panel 15.

When a power is drawn, which is larger than a predetermined threshold, the frontend will however ensure that the full battery voltage is available for the controller 8. This is achieved in that the microprocessor 20 activates the FET charging transistor 23, such that this now connects the battery voltage directly to the output. Thus, full voltage will always be supplied during operation of the actuators 6, such that the speed of the adjustment will be as uniform as possible, regardless of the remaining power of the battery pack 9.

Moreover, the diagram shows a block depicting the circuit 22 for the communications interface between the battery pack 9 and a control box 7. The interface is configured to be able both to send and receive data. As mentioned above, the circuit can be wired or galvanically separated by means of an inductively coupled or an optical link. The communications interface thus enables a control box adapted for communication with the battery pack to receive status information directly from the microprocessor 20 and likewise send information to the microprocessor 20 and it is thus not necessary to emulate a reference battery, e.g. a lead battery, for the control box to be able to register the remaining capacity. Thus is achieved that a new battery pack 9 is adapted for functioning together with a new control box 7 and which likewise can be retrofitted to existing patient lifters 1 and of these be considered as standard battery packs 9 and without special adaption provide this with the advantages of the newest lithium ion battery technology without compromising the capacity of the lithium battery or the ability of the control box 7 of the patient lifter 1 to read out the remaining capacity of the battery.

FIG. 8 shows a linear actuator 26 of the same type as the linear actuators 6 comprising an inner tube 27. Further, the linear actuator comprises an outer tube 28 and a motor housing 29. The linear actuator 26 further comprises a front mounting 30 at the outer end of the inner tube 27 and a rear mounting 31 at the motor housing 29.

FIG. 9 shows the linear actuator 26 of FIG. 8, wherein the motor housing 29 and the outer tube 28 have been partially removed. The main features of the linear actuator 26 comprises a spindle unit consisting of a spindle 32 on which a spindle nut 33 is arranged. The spindle nut 33 can be secured against rotation. The inner tube 27 is secured to the spindle nut 33 and can thus move in and out of the outer tube 28 depending on the direction of rotation of the spindle 32. The spindle 32 is driven by a reversible electric motor 34 via a transmission. Here, the transmission comprises a worm arranged in continuation of the drive shaft of the electric motor and a worm wheel 35 secured to the spindle 32. Moreover, a bearing 36 is secured to the spindle 32. The bearing 35 can e.g. be a ball bearing or a roller bearing.

As to the terms battery box, battery pack and battery cell, it should be clarified that the term battery box covers a housing for a battery pack. The actual battery pack comprises a battery and miscellaneous electronics as described above and indicated in FIG. 5. The battery per se comprises a number of battery cells.

The invention is described above in connection with a patient lifter, but it is understood that the invention is generally applicable to adjustable articles of furniture as stated in the preamble of the description.

The invention claimed is:

1. An adjustable article of furniture comprising at least one adjustable element and an actuator system for adjusting the adjustable element wherein the actuator system comprises:
   at least one electrically driven linear actuator and a driven drive wheel,
   a controller with an operation device,
   connection means for a power supply via mains,
   a power supply including a battery pack with rechargeable batteries of a first type,
   wherein the actuator system includes a frontend as an interface for the battery pack which enables the battery pack to be supplied with a second type of rechargeable batteries different than the first type of rechargeable batteries wherein the battery pack with the second type of rechargeable batteries is emulated to the actuator system as the battery pack containing the first type of rechargeable batteries,
   wherein said frontend is configured to adapt, during an idle period where a current draw from said battery pack having said second type of rechargeable batteries is below a predetermined threshold, an output voltage of the battery pack with the second type of rechargeable batteries so as to correspond to that of the battery pack with the first type of rechargeable batteries having the same remaining capacity.

2. The adjustable article of furniture according to claim 1, wherein the rechargeable batteries of the first type are lead batteries and the rechargeable batteries of the second type are lithium ion batteries.

3. The adjustable article of furniture according to claim 1, wherein the frontend comprises a charging circuit configured to adapt a charging voltage-both up and down to supply the battery pack with an appropriate voltage for charging the rechargeable batteries.

4. The adjustable article of furniture according to claim 1, wherein the frontend, when a current discharged from the frontend exceeds a predetermined threshold, regulates the output voltage of the frontend, such that the controller is supplied directly with the output voltage of the battery.

5. The adjustable article of furniture according to claim 1, wherein the frontend is configured with an inductive link functioning as interface for the communication between the controller and a charger.

6. The adjustable article of furniture according to claim 3, wherein the frontend is configured to by-pass the charging circuit, in case a connected charger is capable of supplying a sufficient voltage and current for charging the battery.

7. The adjustable article of furniture according to claim 3, wherein the battery pack contains a number of battery cells and the frontend comprises a safety circuit for protection of the individual battery cells.

8. The adjustable article of furniture according to claim 3, wherein the frontend comprises a circuit, which monitors the charge into the battery pack and the discharge from the battery pack and is thus capable of indicating the remaining capacity of the battery pack.

9. The adjustable article of furniture according to claim 3, wherein the frontend is equipped with means for communication of data, including charging status, from the battery pack to the controller.

10. The adjustable article of furniture according to claim 3, wherein the frontend is equipped with means for communication of data from the controller to the battery pack, including a capability of a connected charger.

11. The adjustable article of furniture according to claim 10 wherein said frontend is configured to adjust the charging circuit to support the capability of the connected charger based on the communication of data from the controller.

12. The adjustable article of furniture according to claim 10 wherein said frontend adapting the output voltage of the battery pack defines the emulation, said frontend being configured to acknowledge a signal that indicates that the emulation of the battery pack with the first type of rechargeable batteries is not required and to enable the utilization of the battery pack directly without the emulation.

13. The adjustable article of furniture according to claim 9 wherein the means for communication of data from the controller to the battery pack is optical.

14. The adjustable article of furniture according to claim 1 wherein the frontend is incorporated in a separate housing as an interface between the battery pack and the controller.

15. The adjustable article of furniture according to claim 1 wherein said frontend is configured, when said current draw exceeds the predetermined threshold, to regulate the output voltage of the frontend to that of the battery pack with the second type of rechargeable batteries.

\* \* \* \* \*